MEANS AND METHOD TO OBTAIN AN IMPULSE AUTOCORRELATION FUNCTION

Filed June 13, 1967

MATES (codes 2 and 16) MATES (codes 3 and 15) MATES (codes 4 and 14)

| CODES | FORMAT | | | | | | | | N x AUTOCORRELATION FUNCTION [N $\phi_{aa}(t)$] | | | | | | | |
|---|---|---|---|---|---|---|---|---|---|---|---|---|---|---|---|---|
| 1 | 1 | 0 | 0 | 0 | 0 | 0 | 0 | 0 | +8 | +4 | +4 | +4 | +4 | +4 | +4 | +4 |
| 2 | 1 | 1 | 0 | 0 | 0 | 0 | 0 | 0 | +8 | +4 | 0 | 0 | 0 | 0 | 0 | +4 |
| 3 | 1 | 0 | 1 | 0 | 0 | 0 | 0 | 0 | +8 | 0 | +4 | 0 | 0 | 0 | +4 | 0 |
| 4 | 1 | 0 | 0 | 1 | 0 | 0 | 0 | 0 | +8 | 0 | 0 | +4 | 0 | +4 | 0 | 0 |
| 5 | 1 | 0 | 0 | 0 | 1 | 0 | 0 | 0 | +8 | 0 | 0 | 0 | +8 | 0 | 0 | 0 |
| 6 | 1 | 1 | 1 | 0 | 0 | 0 | 0 | 0 | +8 | +4 | 0 | -4 | -4 | -4 | 0 | +4 |
| 7 | 1 | 1 | 0 | 1 | 0 | 0 | 0 | 0 | +8 | 0 | 0 | 0 | -4 | 0 | 0 | 0 |
| 8 | 1 | 1 | 0 | 0 | 1 | 0 | 0 | 0 | +8 | 0 | -4 | 0 | +4 | 0 | -4 | 0 |
| 9 | 1 | 1 | 0 | 0 | 0 | 1 | 0 | 0 | +8 | 0 | -4 | 0 | +4 | 0 | -4 | 0 |
| 10 | 1 | 1 | 0 | 0 | 0 | 0 | 1 | 0 | +8 | 0 | 0 | 0 | -4 | 0 | 0 | 0 |
| 11 | 1 | 0 | 1 | 0 | 1 | 0 | 0 | 0 | +8 | -4 | +4 | -4 | +4 | -4 | +4 | -4 |
| 12 | 1 | 0 | 1 | 0 | 0 | 1 | 0 | 0 | +8 | -4 | 0 | +4 | -4 | +4 | 0 | -4 |
| 13 | 1 | 1 | 1 | 1 | 0 | 0 | 0 | 0 | +8 | +4 | 0 | -4 | -8 | -4 | 0 | +4 |
| 14 | 1 | 1 | 1 | 0 | 1 | 0 | 0 | 0 | +8 | 0 | 0 | -4 | 0 | -4 | 0 | 0 |
| 15 | 1 | 1 | 1 | 0 | 0 | 1 | 0 | 0 | +8 | 0 | -4 | 0 | 0 | 0 | -4 | 0 |
| 16 | 1 | 1 | 0 | 1 | 0 | 1 | 0 | 0 | +8 | -4 | 0 | 0 | 0 | 0 | 0 | -4 |
| 17 | 1 | 1 | 0 | 1 | 0 | 0 | 1 | 0 | +8 | -4 | 0 | +4 | -8 | +4 | 0 | -4 |
| 18 | 1 | 1 | 0 | 0 | 1 | 1 | 0 | 0 | +8 | 0 | -8 | 0 | +8 | 0 | -8 | 0 |
| 19 | 1 | 0 | 1 | 0 | 1 | 0 | 1 | 0 | +8 | -8 | +8 | -8 | +8 | -8 | +8 | -8 |

INVENTOR.
FRANK S. GUTLEBER
BY Alfred C. Hill
AGENT

INVENTOR.
FRANK S. GUTLEBER
BY Alfred C. Hill
AGENT

Fig. 3

| CODES | FORMAT | | | | | | | | | | | | | | | | Nx AUTO CORRELATION FUNCTION $[N \phi \alpha\alpha(t)]$ | | | | | | | | | | | | | | | |
|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 1 | 2 | 3 | 4 | 5 | 6 | 7 | 8 | 9 | 10 | 11 | 12 | 13 | 14 | 15 | 16 |
| A4 | 1 | 1 | 0 | 1 | 0 | 1 | 1 | 0 | 0 | 1 | 0 | 0 | 0 | 0 | 0 | 0 | +16 | 0 | 0 | +4 | 0 | 0 | 0 | −4 | 0 | −4 | 0 | 0 | 0 | +4 | 0 | 0 |
| A4' | 1 | 0 | 0 | 0 | 0 | 0 | 1 | 1 | 0 | 0 | 0 | 1 | 0 | 1 | 0 | 1 | +16 | 0 | 0 | −4 | 0 | 0 | 0 | +4 | 0 | +4 | 0 | 0 | 0 | −4 | 0 | 0 |
| B4 | 1 | 1 | 0 | 1 | 0 | 0 | 1 | 1 | 0 | 0 | 0 | 0 | 0 | 0 | 0 | 1 | +16 | +4 | 0 | 0 | 0 | −4 | 0 | 0 | 0 | 0 | 0 | −4 | 0 | 0 | 0 | +4 |
| B4' | 1 | 0 | 0 | 0 | 0 | 1 | 1 | 0 | 0 | 1 | 0 | 1 | 0 | 1 | 0 | 0 | +16 | −4 | 0 | 0 | 0 | +4 | 0 | 0 | 0 | 0 | 0 | +4 | 0 | 0 | 0 | −4 |
| C4 | 1 | 1 | 0 | 0 | 0 | 1 | 1 | 0 | 0 | 0 | 0 | 0 | 0 | 1 | 0 | 1 | +16 | +4 | 0 | −4 | 0 | 0 | 0 | 0 | 0 | 0 | 0 | 0 | 0 | −4 | 0 | +4 |
| C4' | 1 | 0 | 0 | 1 | 0 | 0 | 1 | 1 | 0 | 1 | 0 | 1 | 0 | 0 | 0 | 0 | +16 | −4 | 0 | +4 | 0 | 0 | 0 | 0 | 0 | 0 | 0 | 0 | 0 | +4 | 0 | −4 |
| D4 | 1 | 0 | 0 | 1 | 0 | 0 | 1 | 0 | 0 | 0 | 0 | 1 | 0 | 1 | 0 | 1 | +16 | −4 | 0 | +4 | 0 | 0 | 0 | 0 | 0 | 0 | 0 | 0 | 0 | +4 | 0 | −4 |
| D4' | 1 | 1 | 0 | 0 | 0 | 1 | 1 | 1 | 0 | 1 | 0 | 0 | 0 | 0 | 0 | 0 | +16 | +4 | 0 | −4 | 0 | 0 | 0 | 0 | 0 | 0 | 0 | 0 | 0 | −4 | 0 | +4 |
| E4 | 1 | 1 | 0 | 0 | 0 | 0 | 1 | 0 | 0 | 1 | 0 | 1 | 0 | 1 | 0 | 0 | +16 | −4 | 0 | 0 | 0 | +4 | 0 | 0 | 0 | 0 | 0 | +4 | 0 | 0 | 0 | −4 |
| E4' | 1 | 0 | 0 | 1 | 0 | 1 | 1 | 1 | 0 | 0 | 0 | 0 | 0 | 0 | 0 | 1 | +16 | +4 | 0 | 0 | 0 | −4 | 0 | 0 | 0 | 0 | 0 | −4 | 0 | 0 | 0 | +4 |
| F4 | 1 | 0 | 0 | 0 | 0 | 0 | 1 | 1 | 0 | 1 | 0 | 1 | 0 | 0 | 0 | 1 | +16 | 0 | 0 | −4 | 0 | 0 | 0 | +4 | 0 | +4 | 0 | 0 | 0 | −4 | 0 | 0 |
| F4' | 1 | 1 | 0 | 1 | 0 | 1 | 1 | 0 | 0 | 0 | 0 | 0 | 0 | 1 | 0 | 0 | +16 | 0 | 0 | +4 | 0 | 0 | 0 | −4 | 0 | −4 | 0 | 0 | 0 | +4 | 0 | 0 |
| G4 | 1 | 0 | 0 | 0 | 0 | 1 | 1 | 1 | 0 | 1 | 0 | 0 | 0 | 1 | 0 | 0 | +16 | 0 | 0 | 0 | 0 | −4 | 0 | +4 | 0 | +4 | 0 | −4 | 0 | 0 | 0 | 0 |
| G4' | 1 | 1 | 0 | 1 | 0 | 0 | 1 | 0 | 0 | 0 | 0 | 1 | 0 | 0 | 0 | 1 | +16 | 0 | 0 | 0 | 0 | +4 | 0 | −4 | 0 | −4 | 0 | +4 | 0 | 0 | 0 | 0 |
| H4 | 1 | 0 | 0 | 1 | 0 | 1 | 1 | 1 | 0 | 0 | 0 | 1 | 0 | 0 | 0 | 0 | +16 | 0 | 0 | 0 | 0 | +4 | 0 | −4 | 0 | −4 | 0 | +4 | 0 | 0 | 0 | 0 |
| H4' | 1 | 1 | 0 | 0 | 0 | 0 | 1 | 0 | 0 | 1 | 0 | 0 | 0 | 1 | 0 | 1 | +16 | 0 | 0 | 0 | 0 | −4 | 0 | +4 | 0 | +4 | 0 | −4 | 0 | 0 | 0 | 0 |

INVENTOR.
FRANK S. GUTLEBER
BY Alfred C. Hill
AGENT

MEANS AND METHOD TO OBTAIN AN IMPULSE AUTOCORRELATION FUNCTION

Fig. 4

| CODES | FORMAT | | | | | | | | | | | | | | | | Nx AUTOCORRELATION FUNCTION $[N\phi\alpha\alpha(t)]$ | | | | | | | | | | | | | | | |
|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 1 | 2 | 3 | 4 | 5 | 6 | 7 | 8 | 9 | 10 | 11 | 12 | 13 | 14 | 15 | 16 |
| $A_2$ | − | − | − | − | 0 | 0 | 0 | − | 0 | 0 | 0 | − | 0 | 0 | 0 | 0 | +16 | +4 | 0 | −4 | 0 | 0 | 0 | 0 | 0 | 0 | 0 | 0 | 0 | −4 | 0 | +4 |
| $A_2'$ | − | 0 | − | 0 | 0 | − | 0 | 0 | 0 | − | 0 | 0 | 0 | − | 0 | − | +16 | −4 | 0 | +4 | 0 | 0 | 0 | 0 | 0 | 0 | 0 | 0 | 0 | +4 | 0 | −4 |
| $B_2$ | − | − | − | 0 | 0 | − | 0 | 0 | 0 | − | 0 | 0 | 0 | 0 | 0 | − | +16 | +4 | 0 | 0 | 0 | −4 | 0 | 0 | 0 | 0 | 0 | −4 | 0 | 0 | 0 | +4 |
| $B_2'$ | − | 0 | − | − | 0 | 0 | 0 | − | 0 | 0 | 0 | − | 0 | − | 0 | 0 | +16 | −4 | 0 | 0 | 0 | +4 | 0 | 0 | 0 | 0 | 0 | +4 | 0 | 0 | 0 | −4 |
| $C_2$ | − | 0 | − | − | 0 | 0 | 0 | − | 0 | 0 | 0 | 0 | 0 | − | 0 | − | +16 | 0 | 0 | +4 | 0 | 0 | 0 | −4 | 0 | −4 | 0 | 0 | 0 | +4 | 0 | 0 |
| $C_2'$ | − | − | − | 0 | 0 | − | 0 | 0 | 0 | − | 0 | − | 0 | 0 | 0 | 0 | +16 | 0 | 0 | −4 | 0 | 0 | 0 | +4 | 0 | +4 | 0 | 0 | 0 | −4 | 0 | 0 |
| $D_2$ | − | − | − | 0 | 0 | − | 0 | 0 | 0 | 0 | 0 | − | 0 | − | 0 | 0 | +16 | 0 | 0 | 0 | 0 | +4 | 0 | −4 | 0 | −4 | 0 | +4 | 0 | 0 | 0 | 0 |
| $D_2'$ | − | 0 | − | − | 0 | 0 | 0 | − | 0 | − | 0 | 0 | 0 | 0 | 0 | − | +16 | 0 | 0 | 0 | 0 | −4 | 0 | +4 | 0 | +4 | 0 | −4 | 0 | 0 | 0 | 0 |
| $E_2$ | − | 0 | − | − | 0 | 0 | 0 | 0 | 0 | − | 0 | − | 0 | 0 | 0 | − | +16 | 0 | 0 | 0 | 0 | −4 | 0 | +4 | 0 | +4 | 0 | −4 | 0 | 0 | 0 | 0 |
| $E_2'$ | − | − | − | 0 | 0 | − | 0 | − | 0 | 0 | 0 | 0 | 0 | − | 0 | 0 | +16 | 0 | 0 | 0 | 0 | +4 | 0 | −4 | 0 | −4 | 0 | +4 | 0 | 0 | 0 | 0 |
| $F_2$ | − | − | − | 0 | 0 | 0 | 0 | − | 0 | − | 0 | 0 | 0 | − | 0 | 0 | +16 | 0 | 0 | −4 | 0 | 0 | 0 | +4 | 0 | +4 | 0 | 0 | 0 | −4 | 0 | 0 |
| $F_2'$ | − | 0 | − | − | 0 | − | 0 | 0 | 0 | 0 | 0 | − | 0 | 0 | 0 | − | +16 | 0 | 0 | +4 | 0 | 0 | 0 | −4 | 0 | −4 | 0 | 0 | 0 | +4 | 0 | 0 |
| $G_2$ | − | 0 | − | 0 | 0 | − | 0 | − | 0 | 0 | 0 | − | 0 | 0 | 0 | − | +16 | −4 | 0 | 0 | 0 | +4 | 0 | 0 | 0 | 0 | 0 | +4 | 0 | 0 | 0 | −4 |
| $G_2'$ | − | − | − | − | 0 | 0 | 0 | 0 | 0 | − | 0 | 0 | 0 | − | 0 | 0 | +16 | +4 | 0 | 0 | 0 | −4 | 0 | 0 | 0 | 0 | 0 | −4 | 0 | 0 | 0 | +4 |
| $H_2$ | − | 0 | − | − | 0 | − | 0 | 0 | 0 | − | 0 | 0 | 0 | − | 0 | 0 | +16 | −4 | 0 | +4 | 0 | 0 | 0 | 0 | 0 | 0 | 0 | 0 | 0 | +4 | 0 | −4 |
| $H_2'$ | − | − | − | 0 | 0 | 0 | 0 | − | 0 | 0 | 0 | − | 0 | 0 | 0 | − | +16 | +4 | 0 | −4 | 0 | 0 | 0 | 0 | 0 | 0 | 0 | 0 | 0 | −4 | 0 | +4 |

INVENTOR.
FRANK S. GUTLEBER
BY Alfred C. Hill
AGENT

| CODES | FORMAT | | | | | | | | | | | | | | | | Nx AUTO CORRELATION FUNCTION [$N\phi aa(t)$] | | | | | | | | | | | | | | | |
|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 1 | 2 | 3 | 4 | 5 | 6 | 7 | 8 | 9 | 10 | 11 | 12 | 13 | 14 | 15 | 16 |
| $A_3$ | 1 | 1 | 0 | 1 | 1 | 1 | 0 | 0 | 0 | 0 | 0 | 1 | 0 | 0 | 0 | 0 | +16 | +4 | 0 | 0 | 0 | 0 | 0 | −4 | 0 | −4 | 0 | 0 | 0 | 0 | 0 | +4 |
| $A_3'$ | 1 | 0 | 0 | 0 | 1 | 0 | 0 | 1 | 0 | 1 | 0 | 0 | 0 | 1 | 0 | 1 | +16 | −4 | 0 | 0 | 0 | 0 | 0 | +4 | 0 | +4 | 0 | 0 | 0 | 0 | 0 | −4 |
| $B_3$ | 1 | 1 | 0 | 1 | 1 | 0 | 0 | 0 | 0 | 1 | 0 | 0 | 0 | 0 | 0 | 1 | +16 | +4 | 0 | 0 | 0 | 0 | 0 | −4 | 0 | −4 | 0 | 0 | 0 | 0 | 0 | +4 |
| $B_3'$ | 1 | 0 | 0 | 0 | 1 | 1 | 0 | 1 | 0 | 0 | 0 | 1 | 0 | 1 | 0 | 0 | +16 | −4 | 0 | 0 | 0 | 0 | 0 | +4 | 0 | +4 | 0 | 0 | 0 | 0 | 0 | −4 |
| $C_3$ | 1 | 1 | 0 | 0 | 1 | 0 | 0 | 1 | 0 | 0 | 0 | 0 | 0 | 1 | 0 | 1 | +16 | 0 | 0 | +4 | 0 | −4 | 0 | 0 | 0 | 0 | 0 | −4 | 0 | +4 | 0 | 0 |
| $C_3'$ | 1 | 0 | 0 | 1 | 1 | 1 | 0 | 0 | 0 | 1 | 0 | 1 | 0 | 0 | 0 | 0 | +16 | 0 | 0 | −4 | 0 | +4 | 0 | 0 | 0 | 0 | 0 | +4 | 0 | −4 | 0 | 0 |
| $D_3$ | 1 | 0 | 0 | 0 | 1 | 1 | 0 | 0 | 0 | 0 | 0 | 1 | 0 | 1 | 0 | 1 | +16 | 0 | 0 | −4 | 0 | +4 | 0 | 0 | 0 | 0 | 0 | +4 | 0 | −4 | 0 | 0 |
| $D_3'$ | 1 | 1 | 0 | 1 | 1 | 0 | 0 | 1 | 0 | 1 | 0 | 0 | 0 | 0 | 0 | 0 | +16 | 0 | 0 | +4 | 0 | −4 | 0 | 0 | 0 | 0 | 0 | −4 | 0 | +4 | 0 | 0 |
| $E_3$ | 1 | 0 | 0 | 1 | 1 | 0 | 0 | 0 | 0 | 1 | 0 | 1 | 0 | 1 | 0 | 0 | +16 | −4 | 0 | 0 | 0 | 0 | 0 | +4 | 0 | +4 | 0 | 0 | 0 | 0 | 0 | −4 |
| $E_3'$ | 1 | 1 | 0 | 0 | 1 | 1 | 0 | 1 | 0 | 0 | 0 | 0 | 0 | 0 | 0 | 1 | +16 | +4 | 0 | 0 | 0 | 0 | 0 | −4 | 0 | −4 | 0 | 0 | 0 | 0 | 0 | +4 |
| $F_3$ | 1 | 1 | 0 | 0 | 1 | 0 | 0 | 1 | 0 | 1 | 0 | 1 | 0 | 0 | 0 | 0 | +16 | −4 | 0 | 0 | 0 | 0 | 0 | +4 | 0 | +4 | 0 | 0 | 0 | 0 | 0 | −4 |
| $F_3'$ | 1 | 0 | 0 | 1 | 1 | 1 | 0 | 0 | 0 | 0 | 0 | 0 | 0 | 1 | 0 | 1 | +16 | +4 | 0 | 0 | 0 | 0 | 0 | −4 | 0 | −4 | 0 | 0 | 0 | 0 | 0 | +4 |
| $G_3$ | 1 | 0 | 0 | 0 | 1 | 1 | 0 | 1 | 0 | 1 | 0 | 0 | 0 | 0 | 0 | 1 | +16 | 0 | 0 | −4 | 0 | +4 | 0 | 0 | 0 | 0 | 0 | +4 | 0 | −4 | 0 | 0 |
| $G_3'$ | 1 | 1 | 0 | 1 | 1 | 0 | 0 | 0 | 0 | 0 | 0 | 1 | 0 | 1 | 0 | 0 | +16 | 0 | 0 | +4 | 0 | −4 | 0 | 0 | 0 | 0 | 0 | −4 | 0 | +4 | 0 | 0 |
| $H_3$ | 1 | 0 | 0 | 1 | 1 | 1 | 0 | 1 | 0 | 0 | 0 | 0 | 0 | 1 | 0 | 0 | +16 | 0 | 0 | +4 | 0 | −4 | 0 | 0 | 0 | 0 | 0 | −4 | 0 | +4 | 0 | 0 |
| $H_3'$ | 1 | 1 | 0 | 0 | 1 | 0 | 0 | 0 | 0 | 1 | 0 | 1 | 0 | 0 | 0 | 1 | +16 | 0 | 0 | −4 | 0 | +4 | 0 | 0 | 0 | 0 | 0 | +4 | 0 | −4 | 0 | 0 |

INVENTOR.
FRANK S. GUTLEBER
BY Alfred C. Hill
AGENT

CODE A (CODE A4 INTERLEAVED WITH ITS MATE CODE A4')

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| FORMAT | 1 | 1 | 1 | 0 | 0 | 0 | 1 | 0 | 0 | 0 | 1 | 0 | 1 | 1 | 0 | 1 | 0 | 0 | 1 | 0 | 0 | 0 | 0 | 1 | 0 | 0 | 0 | 1 | 0 | 0 | 0 | 1 |
| Nx AUTO CORRELATION FUNCTION [$N\phi aa(t)$] | +32 | 0 | 0 | 0 | 0 | +4 | 0 | -4 | 0 | 0 | 0 | +8 | 0 | +4 | 0 | +4 | 0 | +4 | 0 | +4 | 0 | +8 | 0 | 0 | 0 | -4 | 0 | +4 | 0 | 0 | 0 | 0 |

CODE A' (CODE A4 INTERLEAVED WITH COMPLIMENTED MATE CODE A4')

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| FORMAT | 1 | 0 | 1 | 1 | 0 | 1 | 1 | 1 | 0 | 1 | 1 | 1 | 1 | 0 | 0 | 0 | 0 | 1 | 1 | 1 | 0 | 1 | 0 | 0 | 0 | 1 | 0 | 0 | 0 | 1 | 0 | 0 |
| Nx AUTO CORRELATION FUNCTION [$N\phi aa(t)$] | +32 | 0 | 0 | 0 | 0 | -4 | 0 | +4 | 0 | 0 | 0 | -8 | 0 | -4 | 0 | -4 | 0 | -4 | 0 | -4 | 0 | -8 | 0 | 0 | 0 | +4 | 0 | -4 | 0 | 0 | 0 | 0 |

INVENTOR.
FRANK S. GUTLEBER
BY Alfred C. Hill
AGENT

INVENTOR.
FRANK S. GUTLEBER
BY Alfred C. Hill
AGENT

INVENTOR.

FRANK S. GUTLEBER

BY Alfred C. Hill

AGENT

INVENTOR.
FRANK S. GUTLEBER
BY Alfred C. Hill
AGENT

MEANS AND METHOD TO OBTAIN AN IMPULSE AUTOCORRELATION FUNCTION

Filed June 13, 1967 10 Sheets-Sheet 10

INVENTOR.
FRANK S. GUTLEBER
BY Alfred C. Hill
AGENT 3,519,746
Patented July 7, 1970

3,519,746

MEANS AND METHOD TO OBTAIN AN IMPULSE AUTOCORRELATION FUNCTION

Frank S. Gutleber, Wayne, N.J., assignor to International Telephone and Telegraph Corporation, Nutley, N.J., a corporation of Delaware Filed June 13, 1967, Ser. No. 645,697
Int. Cl. H04j
U.S. Cl. 179—15 19 Claims

ABSTRACT OF THE DISCLOSURE

A class of pseudo-noise codes including pairs of code mates where the code mates have cooperating autocorrelation functions which upon autocorrelation detection and linear addition of the outputs thereof provides an impulse output at a given time and a zero output at all other times. The number of code mates can be increased by interleaving each of the original code mates and the different time displaced versions thereof to provide a plurality of first codes and interleaving one code mate and the complemented version of the other code mate of each of the original code mates and the different time displaced versions thereof to provide a code mate for each of the first codes. This process may be continued with the newly generated code mates to further increase the number of code mates. The generated code mates are time or frequency multiplexed for transmission to the detector which separates the multiplexed code mates on a time or frequency basis prior to the autocorrelation detection and linear addition.

BACKGROUND OF THE INVENTION

This invention relates to pulse signalling systems of the code type and more particularly to an improved autocorrelation technique for use in such pulse signalling system.

Correlation techniques have been utilized in the past in signalling processing systems employing signals in the form of a pulse or sequence of pulses. Such pulse signalling systems include, for example, radiant energy reflecting systems, such as radar, radio range finders, radio altimeeters, and the like; pulse communication systems, such as over-the-horizon systems employing various types of scatter techniques, satellite communication systems and the like; and multiple access systems employing address codes to enable utilization of the multiple access system. Correlation techniques when employed in radiant energy reflection systems enhance the resolution of closely spaced reflecting surfaces and in addition, particularly when wide pulse widths are employed, increase the average power transmitted. Correlation techniques employed in pulse communication systems result in increased signal-to-noise ratios without increase of transmitter power and minimize multiple paths effect (fading). Correlation techniques when employed in a multiple access environment also result in increased signal-to-noise ratio without increase of transmitter power and if properly coded prevent or at least minimize the interference or crosstalk between one or more address codes.

According to prior art correlation techniques the received signal is processed by obtaining the product of code elements of the received signal and code elements of a locally generating signal of the same wave form and period as the received signal and integrating the resultant product. The optimum output for such a correlation would be a single peak of high amplitude which has a width substantially narrower than the pulse width of the received signal. Most correlation systems in use today do not produce the desired optimum waveform, but rather provide an output whose waveform has spurious peaks in addition to the desired high amplitude peak. The presence of these spurious peaks is undesirable in that the resolving power of radiant energy reflecting systems is reduced, the signal-to-noise ratio of pulse communication systems and multiple access systems and the minimization of multiple path effects of pulse communication systems is reduced to a level below the optimum value.

Previously a number of improved correlation techniques have been proposed that will result in an impulse correlation function. The term "impulse correlation function," and more specifically "impulse auto-correlation function," as employed herein refers to a waveform having a single high amplitude peak completely free from spurious peaks of lower amplitude elsewhere in the waveform.

One of these new correlation techniques requires the generation of first sequence of coded pulses, a replica of this first sequence of coded pulses, and a second sequence of coded pulses. The first and second sequences of coded pulses are each separately correlated with the replica of the first sequence of coded pulses to produce from each correlation separate correlated outputs which in turn are correlated to produce the impulse correlation fuction. The first and second sequences of coded pulses each have a distinctive code pattern so that when one of the correlated outputs is a finite value the other correlated output is zero resulting in a zero output when these correlated outputs are correlated one with the other except when the first and second sequences of coded pulses are in time coincidence with the replica of the first sequence of coded pulses. The second of these new correlation techniques to obtain an impulse correlation function requires the production of a sequence of coded pulses having a predetermined pattern so that when this sequence of coded pulses and its replica are correlated a zero output will result at all times except when the sequence of coded pulses and its replica are in time coincidence.

The disadvantage of the first impulse correlation function technique above-described is that of requiring the production of a second sequence of coded pulses to assure that when the first sequence of coded pulses and its replica are correlated and produce a finite output that the correlation between the second sequence of coded pulses and the replica of the first sequence of pulses is zero so as to produce a zero output in a third correlation process.

In the second impulse correlation function technique above described, the performance is optimum until it is it becomes very tedious and requires a complex coded pulses to increase the average power transmitted. Then it becomes very tedious and requires a complex coded arrangement to generate the code that will provide the desired implse correlation function and increased average transmitted power.

Correlation systems, and particularly correlation systems employed in a multiple access system, require codes which contain good cross correlation properties to minimize self interference or cross talk between the various codes employed. To obtain the good cross correlation properties of codes employed in correlation detection systems the codes should be of a pseudo-noise characteristic. The reason for employing codes having this characteristic is to ensure that an interfering code is rejected in proportion to the ratio of the spectrum bandwidth to the information bandwidth on the average. A pseudo-noise code to be employed in the present invention should also have an autocorrelation function including a peak amplitude in a time interval equal to the smallest code bit length and zero everywhere else.

Previously phase codes whose autocorrelation function is essentially an impulse autocorrelation function have been discovered. To accomplish the results desired necessitated a minimum of four phases which resulted in achieving an aperiodic impulse response. That is, a cyclic closed code was not necessary to yield the desired result.

Another type of code having good periodic correlation properties is the so called linear maximal length code sequences. These codes are comparatively easily generated with shift registers and modulo two adders. Using K shift registers, code lengths of $(2^K-1)$ are generated and the available quantity of unique codes capable of being obtained in a stipulated time-bandwidth product $$[TW-(2^K-1)]$$

is $$\frac{\phi(2^K-1)}{K} \quad (1)$$

where $\phi(x)$, the Euler phi-function, is the number of integers less than $x$ which are prime to $x$, where $$x=(2^K-1)$$

T=the information sampling period and W=the carrier bandwidth. The autocorrelation function $\phi_{11}(t)$ of this class of codes is given by $$\phi_{11}(t)=\frac{1}{N}$$

where N=the number of code bits in a TW period, or $$N=2^K-1$$

and $$\phi_{11}(t)=1 \text{ for } t=0, N, 2N \ldots \quad (2)$$

$$\phi_{11}(t)=-\frac{1}{2^K-1} \text{ for } t\neq 0, N, 2N \ldots \quad (3)$$

where $t$=the width of a single code bit and has a discrete value related to the number of code bits separating the code and its replica in the autocorrelation process. Since $$\frac{1}{2^K-1}=\frac{1}{TW}=\frac{1}{N}$$

the amplitude of the autocorrelation function is reduced by a sufficient amount (for large time bandwidth products) to be considered negligible. In addition, it remains at a negligible level until the code is repeated. It will be immediately apparent that this actually is not an impulse autocorrelation since there are spurious peaks in the autocorrelation functions of these types of codes.

The previous discussion of pseudo-noise codes has been limited to the autocorrelation properties thereof. The advantage of a pseudo-noise code is found in its cross correlation properties. If the codes are like noise, then the RMS value of the cross correlation function should be reduced by $\sqrt{TW}$ from its autocorrelation value at $t=0$, that is, when the code and its replica are in time coincidence. Thus, the interfering code would be reduced in magnitude by the protection ratio on the average.

SUMMARY OF THE INVENTION

An object of the present invention is to provide a class of codes and an arrangement of detecting these codes which will overcome the disadvantages mentioned above in the previous arrangements producing an impulse correlation function.

Another object of this invention is to provide another class of pseudo-noise codes whose structure and production thereof approaches the simplicity of the maximal length code class and yet attains the impulse correlation function of the multiphased codes.

Still another object of this invention is to provide a class of pseudo-noise codes formed by simple binary sequences which when properly detected will provide an impulse autocorrelation function.

A further object of this invention is to utilize multiplexing techniques for the codes generated to reduce the complexity of code generation and yet maintain the advantage of having a long code sequence.

Still a further object of this invention is to provide a code class having a pseudo-noise characteristic to provide good cross correlation properties for reducing interference between codes.

Still another further object of this invention is to provide a code class where the codes may have autocorrelation functions with high spurious peaks therein which are eliminated when detected in accordance with the principles of this invention.

A feature of this invention is a method of generating codes which upon autocorrelation detection will produce an impulse autocorrelation function comprising the steps of generating at least a first code having a first autocorrelation function and generating at least a second code having a second autocorrelation function predeterminedly related to the first autocorrelation function to produce upon detection of the first and second codes the impulse autocorrelation function including an impulse output at a given time and a zero output at all other times.

Another feature of this invention further includes the step of multiplexing either on a time or frequency basis the first and second codes.

A further feature of this invention is the provision of an autocorrelation detector providing an impulse autocorrelation function at its output comprising a source of first code having a first autocorrelation function and a second code having a second autocorrelation function predeterminedly related to the first autocorrelation function, first means coupled to the source to separately autocorrelate the first and second codes and second means coupled to the first means to combine the resultant signals of the autocorrelation to produce the impulse autocorrelation function.

Still a further feature of this invention is the provision of multiplexing on either a time or frequency basis the first and second codes provided by the above mentioned source.

Still another feature of this invention is the provision of an arrangement operating on a time or frequency basis to separate the multiplexed first and second codes, which are multiplexed on a time or frequency basis, prior to the separate autocorrelation of the first and second codes and a linear addition of the resultant outputs of the autocorrelation.

BRIEF DESCRIPTION IN DRAWING

The above mentioned and other features and objects of this invention will become more apparent by reference to the following description taken in conjunction with the accompanying drawings, in which FIG. 1 is a tabulation of unique codes obtainable from an eight bit code and their respective autocorrelation functions permitting the identification of code mates in accordance with the principles of this invention;

FIG. 3 is a tabulation of the code mates generated in accordance with FIG. 2 and their respective autocorrelation functions;

FIG. 4 is a tabulation of code mates that may be generated from another code mate of FIG. 1 when manipulated as taught in FIG. 2 and their respective autocorrelation functions;

DESCRIPTION OF THE PREFERRED EMBODIMENTS

Figures 1, 7:
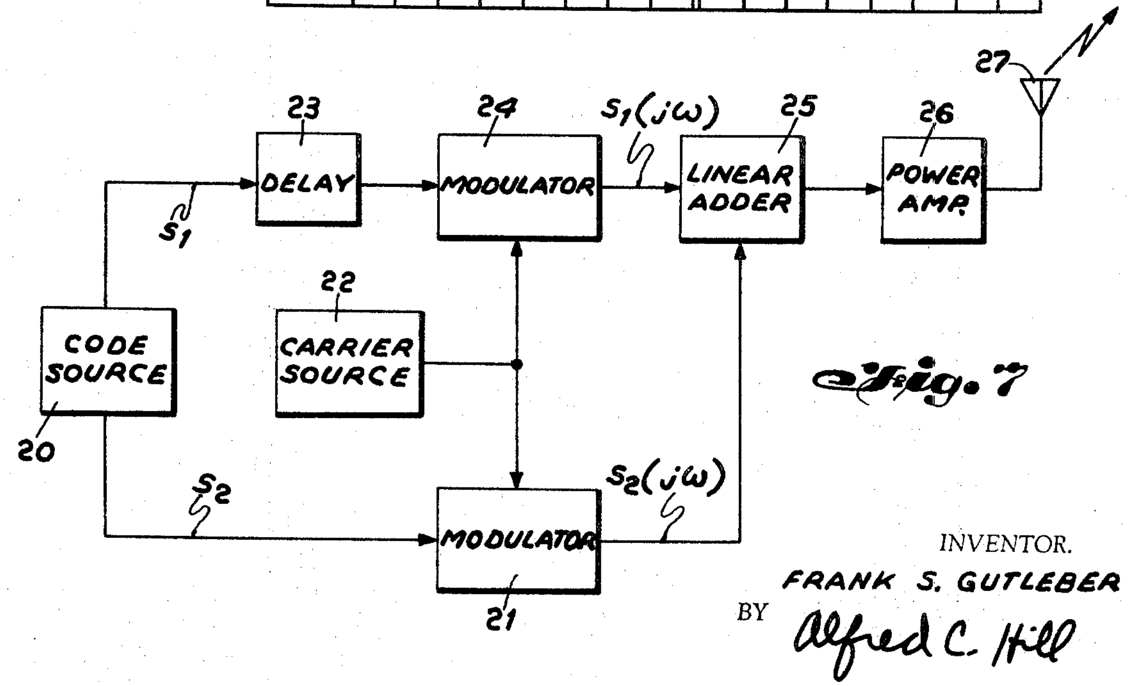
FIG. 7 is a block diagram of a transmitter employing time multiplexing techniques for transmitting any of the code mates described with respect to FIGS. 1 through 6.

While the description of the preferred embodiments are directed to multiplexing the code mates on either a time or frequency basis, it should be noted that the technique described herein will produce the results desired where the code mates are not multiplexed but rather are sent over separate transmission paths such as different wires or cables. In radio transmission, multiplexing is necessary in order to obtain the separate mate code pairs orthogonal to each other.

The pseudo-noise code class of this invention employs a structure approaching the simplicity of the maximal length code class and yet attains the impulse correlation function of the multiphased codes of the prior art. The codes of this code class are simple binary sequences which when properly detected have an impulse autocorrelation function. The required detector of this code class depends on whether time or frequency multiplexing is employed. Each has its particular advantages, however, either method would work equally well with the code class of this invention. A requirement imposed on the code pairs or mates for obtaining an impulse autocorrelation function in accordance with the principles of this invention is that the sum of their individual autocorrelation functions be zero for all value of $t \neq 0$, $N$, $2N$, $3N$, etc. The specific code mates to be utilized with the detectors of this invention must have autocorrelation functions including a main peak in the first bit of the code, zero in other time coincident time position of the code mates and spurious peaks in other time coincident time positions of the code mates having equal magnitude but opposite polarity. This is not too severe a restriction considering that codes with large spurious peaks in its autocorrelation function may be successfully utilized.

The following analysis identifies how many possible code mates exists for an eight bit binary sequence in addition to what they are. The cross correlation properties of the code mates are shown to behave similar to noise so that when the codes of this code class are properly detected there would result a good set of codes for correlation detector type systems, particularly multiple access systems.

In a binary code sequence of eight bits, $2^8=256$ possible code combinations exists. Of this comparatively large quantity, however, only 19 are what could be classified as unique. This is verified below.

The number of possible binary states is:

$$2^N=\sum_{p=0}^{p=N}\frac{N!}{P!(N-p)!} \tag{4}$$

where $p$=number of "1's" and $N$=number of code slots.

Two of these codes (all "0" or all "1") trivial and disgarded reducing the number of codes to:

$$\sum_{p=0}^{p=N}\frac{N!}{p!(N-p)!}-2 \tag{5}$$

Of these, each code is repeated "N" times with time shifts of 1 to N. Therefore, the quantity of unique codes becomes:

$$\frac{1}{N}\left[\sum_{p=0}^{p=N}\frac{N!}{p!(N-p)!}-2\right] \tag{6}$$

and disregarding negative codes necessitates dividing the above quantity by 2. The number of unique codes $q$ therefore becomes:

$$q=\frac{1}{2N}\left[\sum_{p=0}^{p=N}\frac{N!}{p!(N-p)!}-2\right]=\frac{2^N-2}{2N} \tag{7}$$

Strictly speaking this equation is only accurate for odd length sequences since every code of the subset at $p=a$ has a negative at $p^1=N-a$, where $p^1\neq p$. For even length sequences, one code subset at $p=N/2$ contains in its own subset the negative codes many of which have already been ruled out as time shifted codes. A more accurate expression for even length sequences would be given by:

$$q=\frac{1}{N}\sum_{p=1}^{p=N/2}\frac{N!}{p!(n-p)!}-e \tag{8}$$

where $e$=quantity of negative codes not accounted for in the time shifted codes at $p=N/2$.

Solving this equation for $N=8$ resulted in $q=21-e$. And for the subset of codes at $p=4$, $e$ was found to be equal to 2. Hence $q=21-2=19$ unique codes.

These 19 codes are illustrated in FIG. 1 with their associated autocorrelation functions times N with the autocorrelation function being derived from:

$$\phi_{aa}(t)=\frac{1}{N}\sum_{n=1}^{n=N}a_n a_{(n+t)} \tag{9}$$

An inspection of the autocorrelation function times N of the codes of FIG. 1 reveals that three pairs exist which contain the necessary properties in accordance with the principles of this invention for generating an impulse autocorrelation function. These codes are codes #2 and #16, codes #3 and #15, and codes #4 and #14. These results demonstrate that for a time bandwidth product of 16 (8 bit positions and 2 frequencies, or 2 times when multiplexed) there is available $3\times2=6$ unique codes. A maximal length code when generated with four shift registers produces only a maximum of two unique codes as derived from Equation 1. The code class in accordance with the principles of this invention, therefore, increase the available quantity of unique codes when compared with the maximal length code class in addition to achieving $\phi(t)=0$ for all $t\neq0$ in one code period.

As illustrated in FIG. 1, there are only three code mates that have the proper autocorrelation function relationship to provide the desired impulse autocorrelation function. This number of code mates can be increased by properly manipulating the three code mates to form new code mates of length 2N from any existing code mates of length N. This is accomplished by interleaving the original code mates to form one of the new code mates. The second code of the new code mates is obtained by interleaving the original code with the negative or complement of its mate. As will be proven, these two new codes must then form code mates having the characteristic of the code class of this invention. This process may be continued indefinitely to obtain code mates of length $2^M$, where M is an integer.

Figure 2:
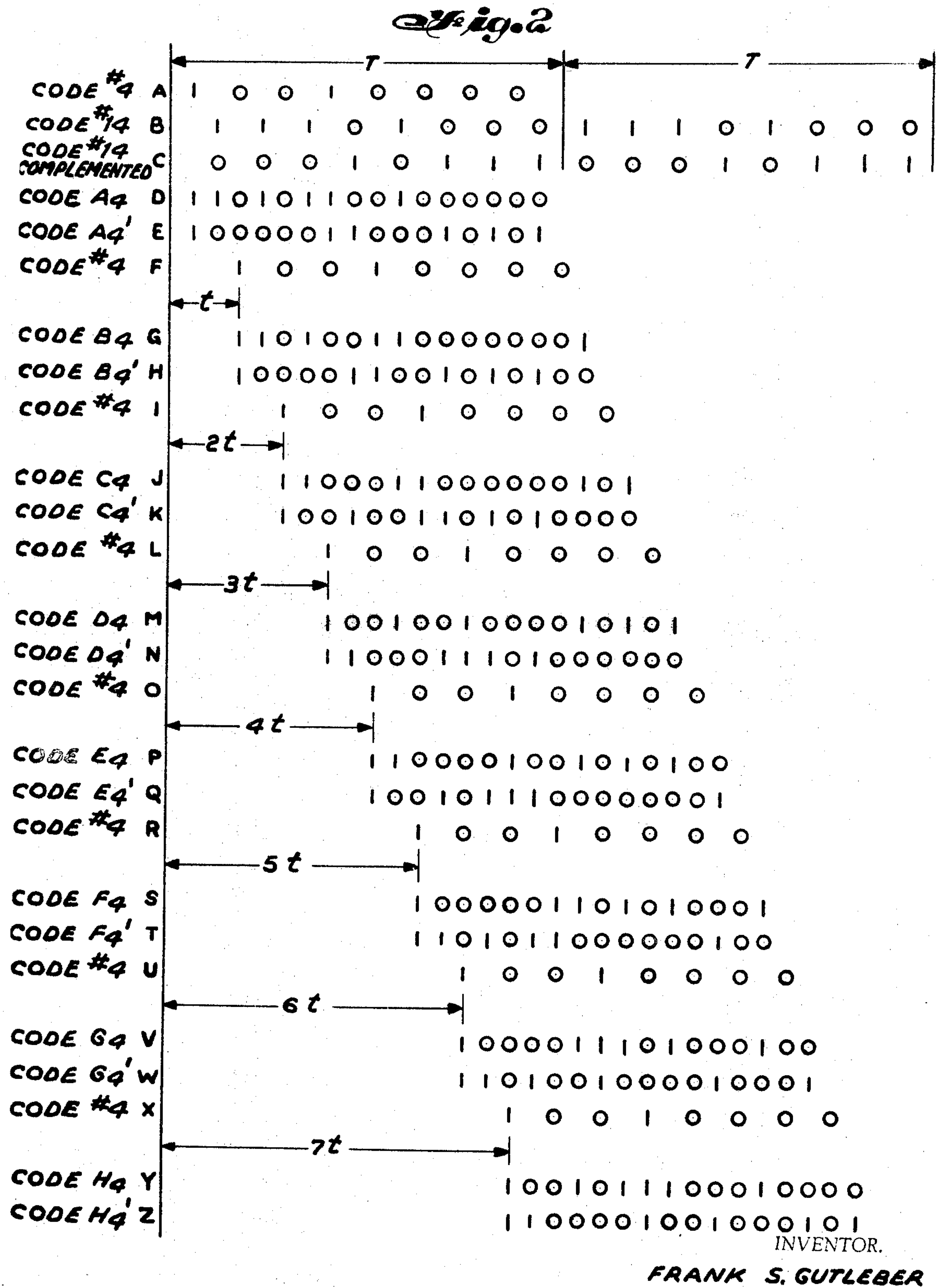
FIG. 2 is a diagrammatic illustration of the manipulation of a pair of code mates necessary to increase the number of code mates.

Referring to FIG. 2, there is illustrated therein in diagrammatic form the process employed in generating new code mates from the code mates code #4 and code

#14. Curve A, FIG. 2 is the code format of code #4 and curve B, FIG. 2, illustrates the code format of code #14. Curve C, FIG. 2 illustrates the negative or complemented version of code #14. By interleaving the codes of curves A and B, FIG. 2, a new code is generated identified as A4 illustrated in curve D, FIG. 2. The mate of code A4 is obtained by interleaving code #4 (curve A) and complemented code #14 (curve C) resulting in code A4′ the mate to code A4. To further increase the number of code mates code #4 is delayed successively by different integral amounts of $t$ (the bit width). A delay of $t$ is illustrated in curve F, FIG. 2. When this delayed code is combined with code #14, a new code B4 is generated and by interleaving the delayed code #4 (curve F) with the complemented code #14 (curve C) the code mate of code B4, identified as code B4′, is generated and illustrated in curve H. This process can be continued with other discrete delays of code #4 with each discrete delayed code #4 being interleaved with code #14 to form one code of new code mates and interleaving the discretely delayed code #4 with the complemented code #14 to form the other code of the code mates as is clearly illustrated in FIG. 2. The result of this process illustrated in FIG. 2 is tabulated in FIG. 3 along with the autocorrelation function of each of the generated codes multiplied by N. It is obvious from the inspection of the $N\times$the autocorrelation function of the newly generated code mates generated from codes #4 and #14 that these code mates actually do meet the requirement placed on codes making up code mates as set forth hereinabove.

By employing the process illustrated in FIG. 2 for codes #2 and #16, a new set of code mates may be generated with these code mates and their autocorrelation functions times N being tabulated in FIG. 4.

Figures 5, 20:
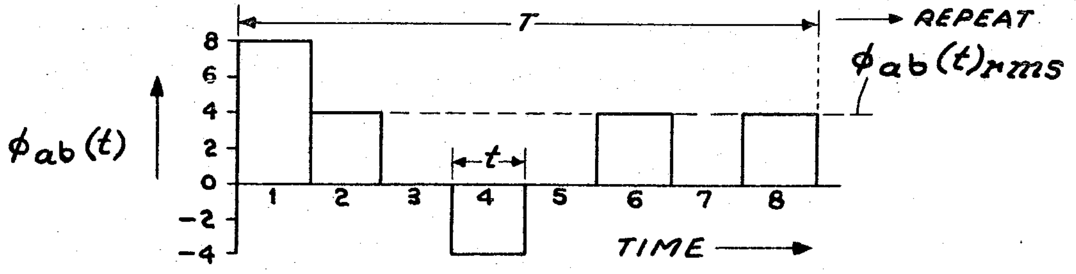
FIG. 5 is a tabulation of code mates that may be generated from the other code mates of FIG. 1 when manipulated in accordance with FIG. 2 and their respective autocorrelation functions.
FIG. 20 is a curve illustrating the cross correlation properties of the code class of this invention.

Again, employing the process of FIG. 2 with codes #3 and #15 other code mates are generated as tabulated in FIG. 5 with their corresponding autocorrelation function times N.

The procedure for generating long codes has been outlined and illustrated with respect to FIGS. 2 through 5 without mathematically verifying that the concept must always work. This has been done to demonstrate how code pairs of large time bandwidth products are obtained. A general mathematic treatment which verifies the proposed process must yield new mate pairs is set forth hereinbelow.

A mate pair is defined as two codes of length N whose periodic autocorrelation functions contain one main peak, zero amplitudes and spurious peaks occurring in coincident bit slots with the magnitudes of the spurious peaks being equal but opposite to each other for all $t\neq 0$, $N$, $2N$, etc. A new mate pair of length $2N$ may be generated from the code mates of length N. This is accomplished by interleaving the original code mates to form one of the new codes. The second new code is then obtained by interleaving the original code with the negative or complement of its mate. It will now be proven that these two new codes must form a mate pair.

Consider a code A given by:

$$A=a_1\ a_2\ a_3\ a_4\ \ldots\ a_N \tag{10}$$

Now postulate the existence of a second code B of length N which forms a mate with code A $$B=b_1\ b_2\ b_3\ b_4\ \ldots\ b_N \tag{11}$$

If A is interleaved with B, a new code of length 2N is generated. This new code is identified as code C.

$$C=a_1\ b_1\ a_2\ b_2\ a_3\ b_3\ \ldots\ a_N\ b_N \tag{12}$$

The autocorrelation function for code C may be written in a general form as:

$$\phi_{CC}(t)=\frac{1}{N}\sum_{i=1}^{i=N}a_i a_{(i+t/2)}+\frac{1}{N}\sum_{i=1}^{i=N}b_i b_{(i+t/2)} \tag{13}$$

when $t$ is even; and $$\phi_{CC}(t)=\frac{1}{N}\sum_{i=1}^{i=N}a_i b\left(i+\frac{t-1}{2}\right)+\frac{1}{N}\sum_{i=1}^{i=N}b_i a\left(i+\frac{t+1}{2}\right) \tag{14}$$

when $t$ is odd.

The negative or complement of code B, code $\overline{B}$, will also be a mate to Code A since its autocorrelation function would be exactly the same as for code B. Code $\overline{B}$ may be expressed as:

$$\overline{B}=\overline{b}_1\ \overline{b}_2\ \overline{b}_3\ \overline{b}_4\ \ldots\ \overline{b}_N \tag{15}$$

Interleaving code A with code $\overline{B}$ results in code D:

$$D=a_1\ \overline{b}_1\ a_2\ \overline{b}_2\ a_3\ \overline{b}_3\ a_4\ \overline{b}_4\ \ldots\ a_N\overline{b}_N \tag{16}$$

and the autocorrelation function of code D would be:

$$\phi_{DD}(t)=\frac{1}{N}\sum_{i=1}^{i=N}a_i a_{(i+t/2)}=\frac{1}{N}\sum_{i=1}^{i=N}\overline{b}_i\overline{b}_{(i+t/2)} \tag{17}$$

when $t$ is even; and $$\phi_{DD}(t)=\frac{1}{N}\sum_{i=1}^{i=N}a_i\overline{b}_{\left(i+\frac{t-1}{2}\right)}+\frac{1}{N}\sum_{i=1}^{i=N}\overline{b}_i a_{\left(i+\frac{t+1}{2}\right)} \tag{18}$$

when $t$ is odd.

Since codes A and B form code mates, and codes A and $\overline{B}$ form code mates, both Equations 13 and 17 must aways sum to zero. Therefore, the autocorrelation function of each new code would always be zero for even values of $t$. The magnitude for odd values of $t$ is given by Equations 14 and 18; and since:

$$a_i b_j=-a_i b_j$$

Hence:

$$\phi_{DD}(t)=-\phi_{CC}(t)\text{ for all }t\neq 0$$

Equations 7 and 8 were utilized to identify the quantity of unique codes (time translated codes and negative codes being excluded) existing in any binary sequence of length N. As pointed out hereinabove, six unique codes are present for an eight bit sequence. It was not an unreasonable task to establish every mate pair by computing the autocorrelation function for each of the 19 codes. However, this procedure becomes unreasonable for longer code lengths. As an example a 16 bit code would contain approximately 2,000 unique binary code sequences out of a total of $2^{16}=65,536$ binary codes. The code extension method outlined hereinabove with respect to FIGS. 2 through 5 identifies a large portion of the available unique codes in a simple systematic manner. It was shown that a total of three code mates existed in an eight bit sequence. Therefore, for each code mates, or code pairs, $8\times 8=64$, 16 bit codes may be established. This occurs since any code may be interleaved with any time shift of its mate. In some cases duplicate codes may result, however, every pair generated this way would yield a mate pair. Since this is so, it would be worthwhile to determine all the mate pairs obtainable by the proposed process and then eliminates any duplication. In the 16 bit sequence, a total of $64\times 3=192$ code mates may be readily generated. Twenty-four of the available codes and their autocorrelation functions times N have been tabulated in FIGS. 3, 4 and 5 in sets of eight. An examination of the twenty-four codes which were generated in accordance with the technique of FIG. 2 and tabulation in FIGS. 3, 4 and 5 reveals that they are all unique. Every one of these codes including their time shifts are different. This is in spite of the fact that a number of the codes have the same N times autocorrelation function. It is also possible to pair the codes differently than illustrated in FIGS. 3, 4 and 5. For instance, code D3 may be used to form a mate with C3 or E3 may be paired with either A3 or B3 rather than E3′. The fact that the resulting codes tabulated in FIGS. 3, 4 and 5 may be paired many different ways adds to the versatility of the code class.

The foregoing demonstrates that a minimum of twenty unique codes exist (which becomes 48 due to multiplexing) with a possibility of realizing 168 more unique codes (or 336 due to multiplexing). Establishing a unique quantity of codes between 48 and 384 for a time bandwidth product of 32 is quite significant. Only 6 unique codes are available in the maximal length code class for a time bandwidth product of 31.

Figures 6, 9:
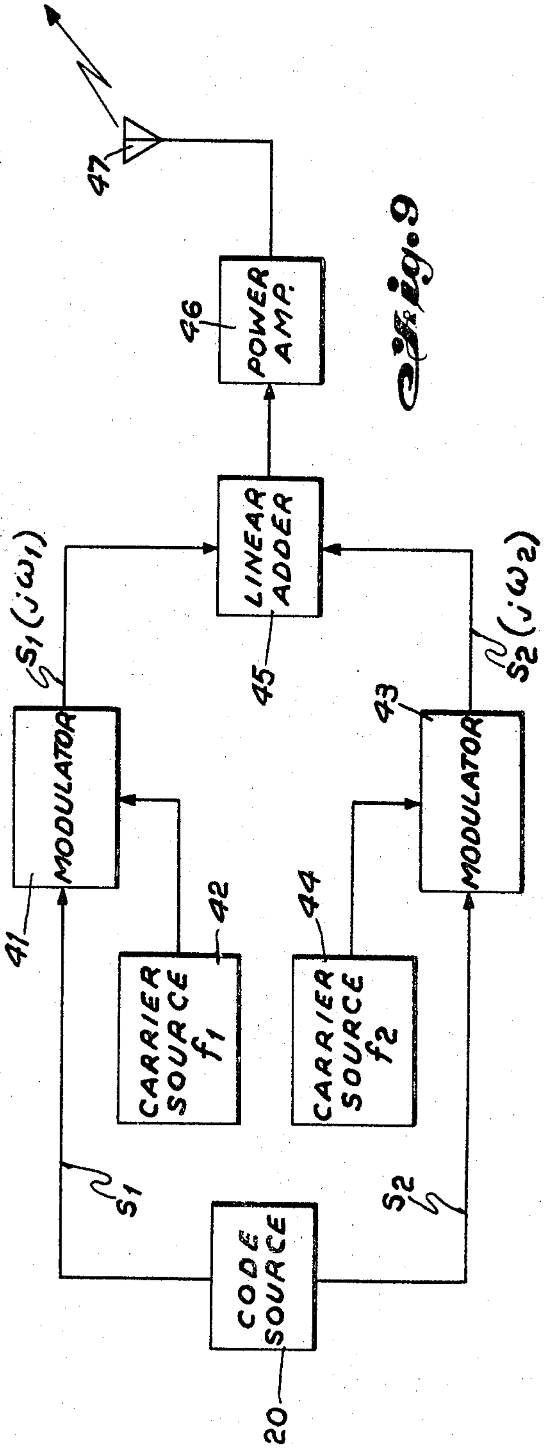
FIG. 6 is a diagrammatic illustration of code mates generated from the first code mates of FIG. 3 in accordance with the principles of this invention and their respective autocorrelation functions.
FIG. 9 is a block diagram of a transmitter employing frequency multiplexing techniques for transmitting the code mates described with respect to FIGS. 1 through 6.

As a point of interest, a 32 bit mate pair was generated from the 16 bit mate pair made up of codes A4 and A4′. The resulting 32 bit code mates are illustrated in FIG. 6 along with their autocorrelation function multiplied by N. Code A was obtained by interleaving code A4 with code A4′. Code A′ was obtained by interleaving code A4 with the negative or complemented code A4′.

Referring to FIG. 7, there is illustrated therein a block diagram of a transmitter employed in a time multiplex arrangement in accordance with the principles of this invention. Code source 20 generates codes S1 and S2, were codes S1 and S2 are those codes that make up code mates. Code S2 is coupled directly to modulator 21 to modulate the output of carrier source 22 at a frequency *f*. Code signal S1 is coupled through delay means 23 to time interleave code S1 with respect to code S2. The output of delay 23 is coupled to modulator 24 to modulate the carrier wave of source 22. The resultant output of modulators 21 and 24 are coupled to a linear adder 25 for combining on a time multiplex basis. The output of adder 25 is then coupled to power amplifier 26 and, hence, to antenna 27 for radiation therefrom.

Figures 8, 10:
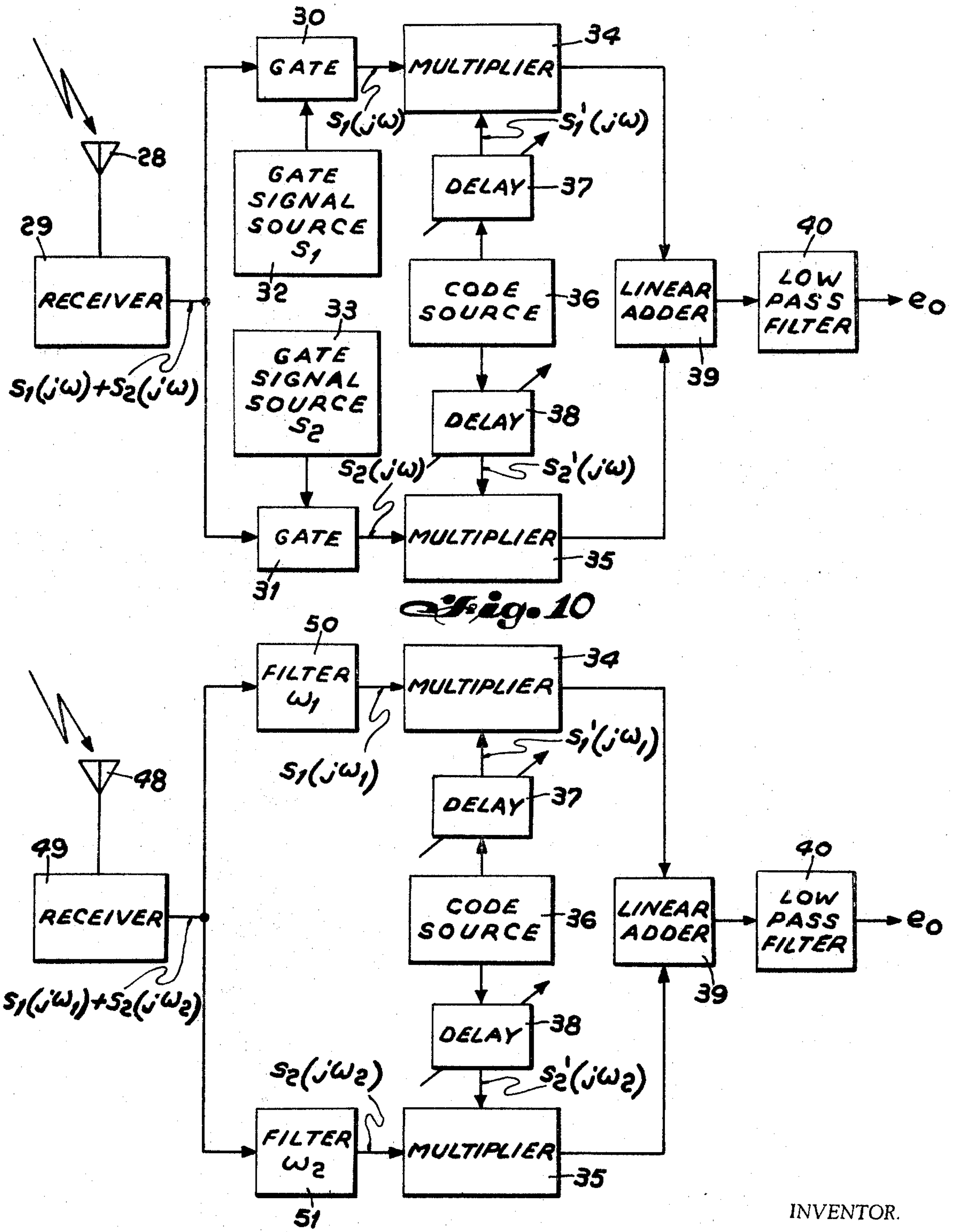
FIG. 8 is a block diagram of a time multiplex receiver cooperating with the transmitter of FIG. 7 in accordance with the principles of this invention.
FIG. 10 is a block diagram of a frequency multiplex receiver cooperating with the transmitter of FIG. 9 in accordance with the principles of this invention.
Figure 12:
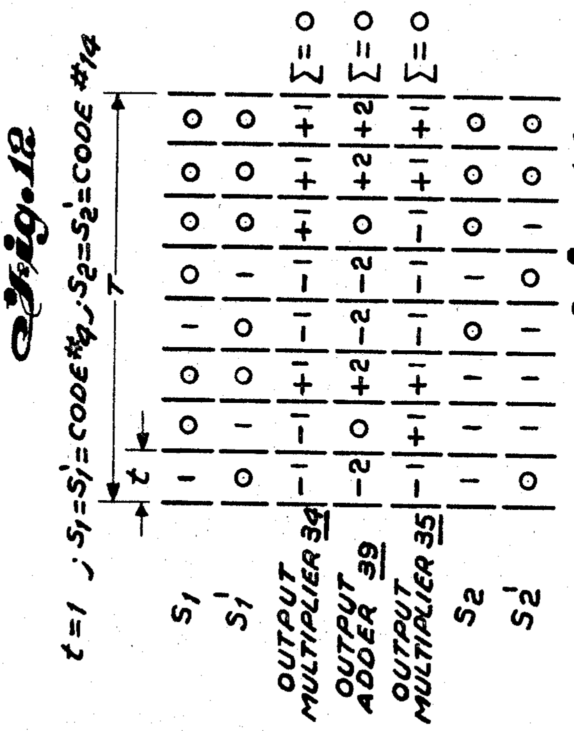
FIGS. 11 through 18 are diagrams illustrating that an impulse autocorrelation function is actually produced in accordance with the principles of this invention.

Referring to FIG. 8, there is illustrated therein a detector arrangement which receives the output from the transmitter of FIG. 7 on antenna 28 for coupling to receiver 29 which recovers the time multiplex code signals. The output of receiver 29 is coupled to both gates 30 and 31 which are appropriately activated by an S1 gate signal and S2 gate signal applied from sources 32 and 33, respectively. Upon occurrence of gate signal S1 from source 32, gate 30 is activated to separate code S1 from the time multiplexed code at the output of receiver 29. During occurrence of the S2 gate signal from source 33, gate 31 is activated to separate code signal S2 from the time multiplexed code signal in the output of receiver 29. The S1 code output from gate 30 is coupled to multiplier 34 and the S2 code output from gate 31 is coupled to multiplier 35. A code source 36 similar in structure to code source 20 generates a replica of codes S1 and S2 identified as code S1′ and code S2′. These two replicas from source 36 are coupled through delay devices 37 and 38 to the appropriate one of multipliers 34 and 35. When delay devices 37 and 38 are properly adjusted, the replicas S1′ and S2′ are coupled, respectively, to multipliers 34 and 35 in time coincidence with the received codes S1 and S2. When time coincidence is present, multipliers 34 and 35 will each produce an output of the same polarity which when linearly added in adder 39 results in the main peak or impulse output. At all other times where the replicas S1′ and S2′ are not in time coincidence with the received codes S1 and S2 there will be either no output from either multipliers 34 and 35, or there will be a spurious output from multiplier 35 and a spurious output from multiplier 34. These spurious outputs will have equal magnitude but opposite polarity so that when they are added together in adder 39 the result in a zero output from adder 39. For instance, assume S1 and S2 are, respectively, the mate codes #4 and #14. At time coincidence ($t=0$) a pulse having a magnitude of eight will appear at the output of multipliers 34 and 35 resulting in an impulse at the output of adder 39 having an amplitude of sixteen. If the delay between the replicas and the received codes are shifted in time to positions 2, 3, 5, 7 and 8, multipliers 34 and 35 will produce zero outputs resulting in zero outputs from linear adder 39. On the other hand, if the replicas and the received codes are delayed to time positions 4 and 6 one of multipliers 34 will produce a plus four unit amplitude output while the other of multipliers 35 will produce a minus four unit amplitude output which when added in linear adder 39 results in a zero output thereby providing the desired impulse correlation function after integration in the low pass filter 40.

In addition, there would be no loss in detection efficiency due to multiplexing. The output signal of each of multiplier 34 and 35 would sum to eight at $t=0$ and being correlated would double or increase to sixteen in the linear adder 39. The noise in each bit would sum to $\sqrt{8}$ out of each multiplier and would be uncorrelated entering linear adder 39. Therefore, the output noise would increase by $\sqrt{8}\times\sqrt{2}=\sqrt{16}=4$. Hence, the improvement to signal-to-noise voltage over the input carrier signal-to-noise voltage would be $16/\sqrt{16}=16/4=4$ which is the same as detecting with a single correlation detector over a sixteen bit code length.

The bit code class under consideration is quite unique in that the codes may be generated with simple two set binary sequences, there is a great quantity of available discrete codes in a specified time bandwidth product than for a maximal length code class, an impulse autocorrelation function is realized making this code class ideally suited for orthogonal pulse code modulation (PCM) system, that is, the intelligence may be coded orthogonally resulting in a PCM system with excellent transmission efficiency, and there is no loss in the detection efficiency due to multiplexing.

Referring to FIG. 9, there is illustrated therein in block diagram form a frequency multiplex transmitter comprising code source 20 to generate code S1 and code S2 which are code mates. Code S1 is coupled to modulator 41 to modulate a carrier of frequency *f1* from source 42. Code S2 is coupled to modulator 43 to modulate carrier of frequency *f2* from source 44. The modulated output from modulators 41 and 43 are coupled to linear adder 45 whose output is coupled to power amplifier 46 and, hence, to antenna 47 for propagation therefrom.

Referring to FIG. 10, the frequency multiplexed code signals propagated from antenna 47 (FIG. 9) are received on antenna 48 and coupled to receiver 49 providing at its output the frequency multiplexed code signals. Filter 50 is coupled to the output of receiver 49 tuned to frequency *f1* to recover the code signal S1 and filter 51 is coupled to receiver 49 tuned to frequency *f2* to recover code signal S2. The thusly separated code signals are then coupled to equipment identical to that described in connection with FIG. 8 to produce at the output thereof an impulse correlation function. The equipment includes multipliers 34 and 35, code source 36, delay means 37 and 38, linear adder 39 and low pass filter 40. The operation of this portion of FIG. 10 is identical to that described hereinabove with relation to FIG. 8 and thus further description is deemed unnecessary.

Referring to FIGS. 11 through 18, there is disclosed therein diagrammatic illustrations of the operation of the correlation detection arrangement in accordance with the principles of this invention illustrating the production of an impulse autocorrelation function. In all of these illustrations code #4 is employed as code signal S1 and its replica S1′ and code #14 is code signal S2 and its replica S2′. The difference between each one of these illustrations occurs in the delay between the replicas and their associated codes. Also, in these figures the following logical relationships are used to demonstrate the production of an impulse autocorrelation function.

$$0\times1=-1$$
$$1\times0=-1$$
$$1\times1=+1$$
$$0\times0=+1$$

Figure 14:
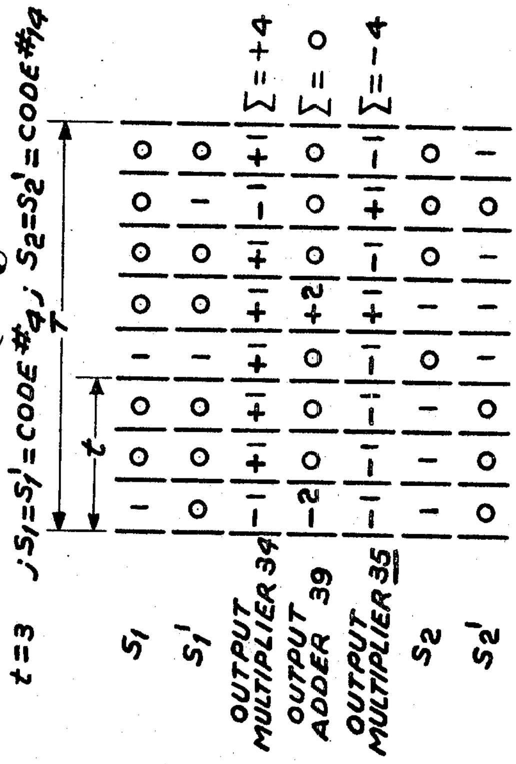
Figure 11:
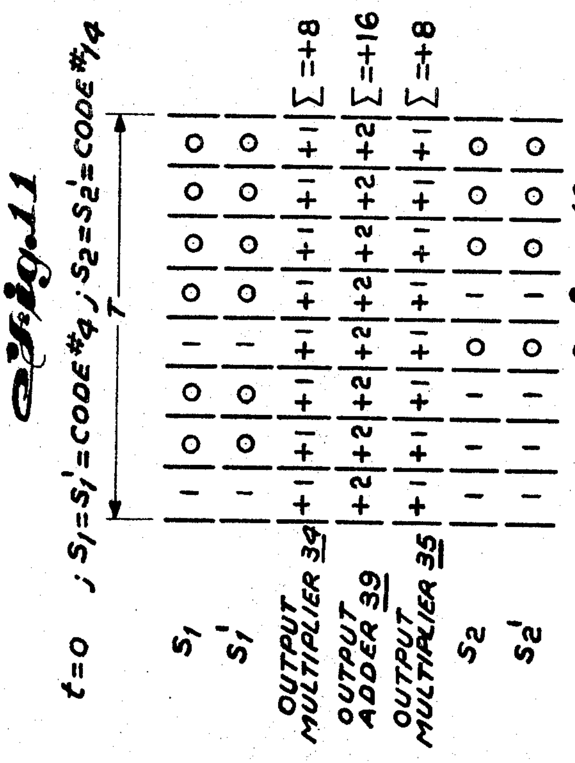
Figure 13:
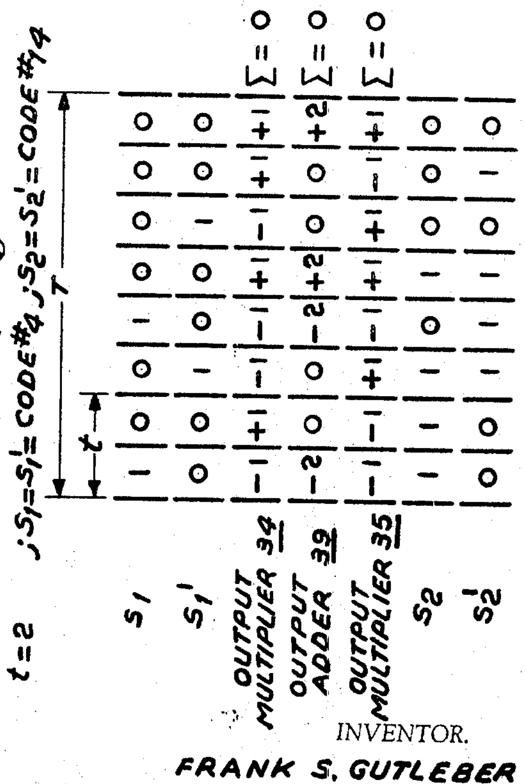
Figure 16:
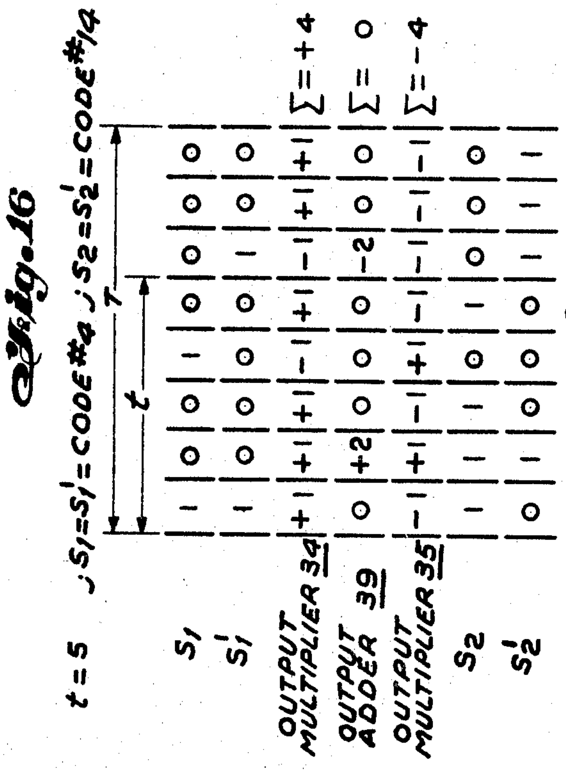
Figure 18:
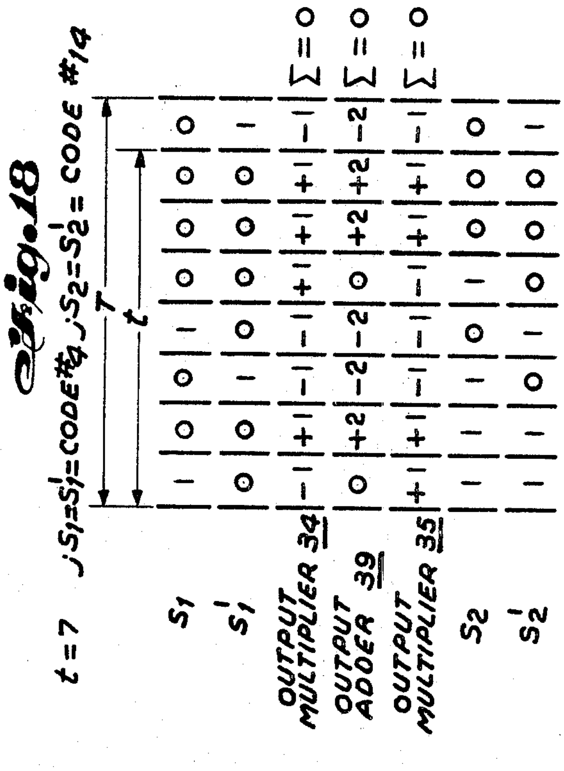
Figure 15:
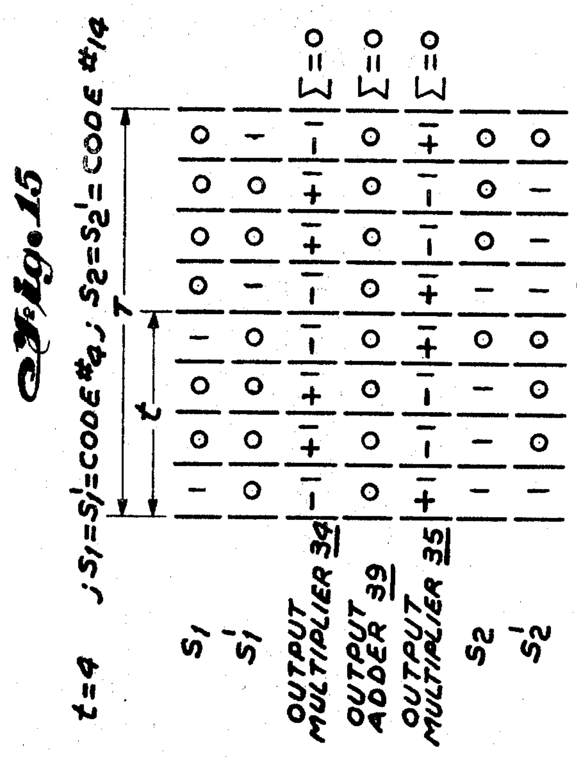
Figure 17:
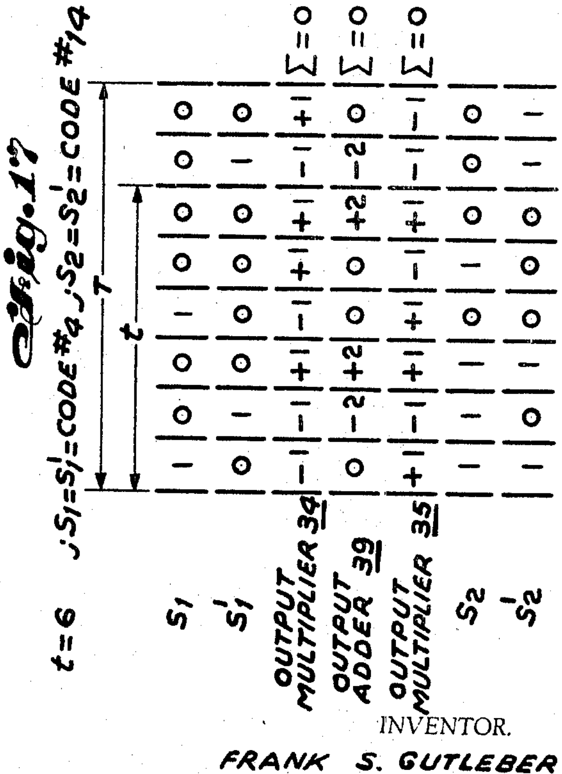

As illustrated in FIG. 11, the replicas and their associated codes are in time coincidence meaning that $t=0$. The output of multiplier 34 is illustrated with its summation being equal to +8. The output of multiplier 35 is illustrated with its summation being equal to +8. The output of adder 39 is also illustrated with its summation being equal to 16. FIGS. 12, 13, 15, 17 and 18 illustrate, respectively, the condition when $t=1$, $t=2$, $t=4$, $t=6$, and $t=7$. In each of these illustrations the resultant output of multipliers 34 and 35 are illustrated along with their summation which in all cases is zero. The output of adder 39 is also illustrated showing that the summation of the individual bits equal zero. FIGS. 14 and 16 illustrate how the spurious peaks in the code mates have equal amplitude but opposite polarity to produce the desired zero output from adder 39. It will be observed that the output of multipliers 34 in both figures results in a summation of +4 while the output from multiplier 35 results in a summation equal to −4. When these two outputs of multipliers 34 and 35 are added in adder 39, the resultant output is zero as illustrated. This is also verified by considering the linear addition of the individual bit outputs of multipliers 34 and 35 which again results in a zero output from adder 39.

Figure 19:
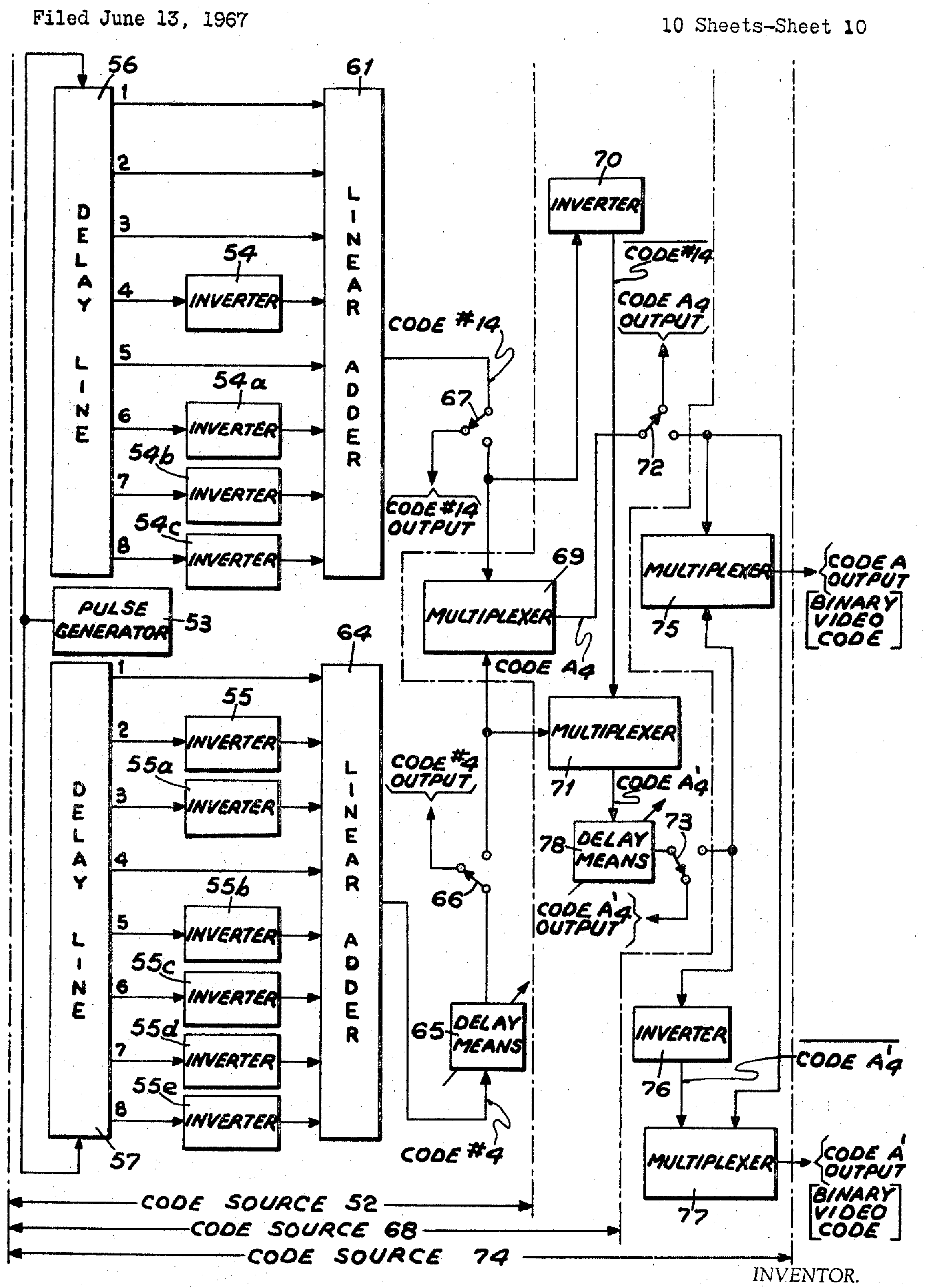
FIG. 19 is a block diagram of a code source in accordance with the principles of this invention that may be employed as the code source of FIGS. 7 through 10.

Referring to FIG. 19, there is disclosed therein one form of a code source which may be utilized for code source 20 of FIGS. 7 and 9 and the code source 36 of FIGS. 8 and 9 with appropriate modification thereof to produce the desired replicas of the code signals produced by code sources 20. The code source 52 is the basic code source for the production of eight bit code mates and is illustrated for the production of codes #4 and #14. Pulses from pulse generator 53 are coupled to delay lines 56 and 57 having eight outputs therealong time spaced to provide the desired bit spacing of the codes generated. The tops of delay line 56 are coupled directly to linear adder 61 to provide binary "1" and through inverters 54 to provide binary "0." As illustrated the circuit arrangement between delay line 56 and adder 61 generates code #14. The taps of delay line 57 are coupled directly to linear adder 64 to provide binary "1" and through inverters 55 to provide binary "0." As illustrated the circuit arrangement between delay line 57 and adder 61 generates code #4. With delay means 65 set to zero, switch 66 positioned as illustrated, and switch 67 positioned as illustrated, it would be possible to provide code #4 as one of the codes S1 and S2 and code #14 as the other of the codes S1 and S2.

By moving switches 66 and 67 to their other position, it would be possible to provide a code source 68 providing sixteen bit code mates. As illustrated in FIG. 19, the sixteen bit code mates are codes A4 and A4′ as illustrated in curves D and E, FIG. 2 and tabulated in FIG. 3. By adjusting delay means 65 to produce the delays illustrated in FIG. 2, it would also be possible to provide the seven other code mates tabulated in FIG. 3, the production of which are diagrammatically illustrated in FIG. 2. To produce the sixteen bit code mates, the output from delay means 65 and the output from adder 61 are coupled to multiplexer 69 to interleave code #4 and code #14 to produce code A4, or any of the other codes B4 to H4 depending upon the setting of the delay in delay means 65. The output from adder 61 is also coupled to phase inverter 70 to provide the complemented code #14 which in turn is coupled to multiplexer 71 together with code #4 from delay means 65. The two inputs to multiplexer 71 are interleaved to produce code A4′, or any of the other codes B4′ to H4′. The output from source 68 is provided by switch 72 set in the position illustrated and switch 73 set in the position illustrated.

To produce thirty-two bit code mates, code source 74 is provided which adds to the components of sources 52 and 68, multiplexer 75, phase inverter 76 and multiplexer 77. Switches 72 and 73 are set to their other position so that the output of multiplexer 69 is coupled to multiplexer 75 together with the output from multiplexer 71 through delay means 78 which provides the same function as delay means 65 to increase the number of code mates having thirty-two bits. The operation of multiplexer 75 is to interleave code A4 and code A4′ to provide code A at the output of source 74. The output from delay means 78 is coupled to phase inverter 76 to produce the complemented version of code A4′. The output from inverter 76 is coupled to multiplier 77 together with the output of multiplexer 69 to produce code A′, the other output of source 74.

The description of the code sources of FIG. 19 has been directed to the utilization of a given one of the code mates listed in FIG. 1 and the extension technique applied to these code mates to generate sixteen bit code mates and thirty-two bit code mates. It is to be remembered that the code mates identified in FIG. 1 can likewise be generated and extended to provide sixteen and thirty-two bit code mates by merely changing the connection between gates 58 and 60 and delay line 56 and gates 61 and 63 and delay line 57 to provide the code format for the code mates of eight bits.

It has been previously mentioned that the code mates generated and detected in accordance with the principles of this invention are of the pseudo-noise type. This can be demonstrated by considering their interference properties which in effect is determined by the cross correlation properties of the multiplexed code mates. The cross correlation function can readily be obtained from the following equation:

$$\phi_{ab}(t)=\frac{1}{N}\sum_{n=1}^{n=N} a_n b_{(n+t)} \qquad (19)$$

The cross correlation properties of several code pairs has been identified and the results in general are similar. A typical example is the code mates #3 and #15 cross correlated with the code mates #4 and #14 which is illustrated in FIG. 20. From FIG. 20, the RMS value is $$\sqrt{\frac{64+16\times 4}{8}}=4$$

when average over T. Since the peak output of the autocorrelation function at $t=0$ multiplied by N is equal to 16, the protection ratio would be $\sqrt{16}=4$. Hence, the peak output reduced by the protection ratio is equal to ¼(16)=4 which is equal to the RMS value of $N\phi_{ab}(t)$. That is, on the average the cross correlation between two code mates is $1\sqrt{TW}$ times the value of the autocorrelation function at $t=0$. This is the condition which exists between two pseudo-noise codes and applies to the code class of the invention.

While I have described above the principles of my invention in connection with specific apparatus it is to be clearly understood that this description is made only by way of example and not as a limitation to the scope of my invention as set forth in the objects thereof and in the accompanying claims.

I claim:

1. A method of generating codes which upon detection will produce an impulse autocorrelation function comprising the steps of:

generating at least a first code having a first autocorrelation function; and generating at least a second code having a second autocorrelation function predeterminedly related to said first autocorrelation function to produce upon detection of both said first and second codes said impulse autocorrelation function including an impulse output at a given time and a zero output at all other times.

2. A method according to claim 1, further including the step of multiplexing said first and second codes.

3. A method according to claim 2, wherein said step of multiplexing includes
time multiplexing said first and second codes.

4. A method according to claim 2, wherein said step of multiplexing includes
frequency multiplexing said first and second codes.

5. A method according to claim 1, wherein
said step of generating said first code includes
generating a plurality of codes each having a different given autocorrelation function; and
said step of generating said second code includes
generating a mate code for each of said plurality of codes, each of said mate codes having a different autocorrelation function predeterminedly related to said given autocorrelation function of said code with which it is a mate to produce upon autocorrelation detection of each of said codes and the associated one of said mate codes said impulse autocorrelation function.

6. A method according to claim 5, further including the step of
multiplexing each of said plurality of codes with the associated one of said mate codes.

7. A method according to claim 1, further comprising the steps of
interleaving said first and second codes to produce a third code having a third autocorrelation function;
complementing a given one of said first and second codes; and
interleaving the other of said first and second codes and said complemented one of said first and second codes to produce a fourth code having a fourth autocorrelation function predeterminedly related to said third autocorrelation function to produce upon autocorrelation detection of said third and fourth codes said impulse autocorrelation function.

8. A method according to claim 7, further comprising the step of
multiplexing said third and fourth code.

9. A method according to claim 7, further comprising the steps of
interleaving said third and fourth codes to produce a fifth code having a fifth autocorrelation function;
complementing a given one of said third and fourth codes; and
interleaving the other of said third and fourth codes and said complemented one of said third and fourth codes to produce a sixth code having a sixth autocorrelation function predeterminedly related to said fifth autocorrelation function to produce upon autocorrelation detection of said fifth and sixth codes said impulse autocorrelation function.

10. A method according to claim 9, further comprising the step of
multiplexing said fifth and sixth code.

11. A detector providing an impulse autocorrelation function at its output comprising:
a source of a first code having a first autocorrelation function and a second code having a second autocorrelation function predeterminedly related to said first autocorrelation function;
first means coupled to said source to separately detect both said first and second codes; and
second means coupled to said first means to combine the resultant signals of said detection to produce said impulse autocorrelation function including an impulse output at a given time and a zero output at all other times.

12. A detector according to claim 11, wherein
said first and second codes of said source are multiplexed; and
said first means includes
third means coupled to said source to separate said first and second codes from said multiplexed first and second codes.

13. A detector according to claim 12, wherein
said first and second codes of said source are time multiplexed; and
said third means includes
a first time coincident gating means coupled to said source to separate said first code from said time multiplexed first and second codes, and
a second time coincident gating means coupled to said source to separate said second code from said time multiplexed first and second codes.

14. A detector according to claim 12, wherein
said first and second codes of said source are frequency multiplexed; and
said third means includes
a first filter means coupled to said source to separate said first code from said frequency multiplexed first and second codes, and
a second filter means coupled to said source to separate said second code from said frequency multiplexed first and second codes.

15. A detector according to claim 12, wherein
said second means includes
linear adder means to combine said resultant signals.

16. A detector according to claim 12, wherein
said first means further includes
fourth means coupled to said third means to autocorrelate said first code with a replica thereof and said second code with a replica thereof.

17. A detector according to claim 16, wherein
said fourth means includes
fifth means to generate a replica of said first code,
sixth means to generate a replica of said second code,
first multiplier means coupled to said third means and said fifth means, and
second multiplier means coupled to said third means and said sixth means.

18. A detector according to claim 17, wherein
said second means includes
linear adder means coupled to said first and second multiplier means.

19. A detector according to claim 18, wherein
said second means further includes
an integrator means coupled to the output of said linear adder means.

References Cited

UNITED STATES PATENTS

| | | |
|---|---|---|
| 3,335,409 | 8/1967 | Heller. |
| 3,432,619 | 3/1969 | Blasbalg. |

RALPH D. BLAKESLEE, Primary Examiner

U.S. Cl. X.R.

340—354